United States Patent
Medvinsky et al.

(10) Patent No.: US 12,231,555 B2
(45) Date of Patent: Feb. 18, 2025

(54) AUTHENTICATION AND VALIDATION PROCEDURE FOR IMPROVED SECURITY IN COMMUNICATIONS SYSTEMS

(71) Applicant: GRABTAXI HOLDINGS PTE. LTD., Singapore (SG)

(72) Inventors: Gennady Medvinsky, Seattle, WA (US); Surya Anil Lingamallu, Seattle, WA (US); Hardik Bipinbhai Doshi, Seattle, WA (US); Prasanna Kanagasabai, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 189 days.

(21) Appl. No.: 17/919,485

(22) PCT Filed: Apr. 20, 2021

(86) PCT No.: PCT/SG2021/050225
§ 371 (c)(1),
(2) Date: Oct. 17, 2022

(87) PCT Pub. No.: WO2021/216003
PCT Pub. Date: Oct. 28, 2021

(65) Prior Publication Data
US 2023/0198751 A1  Jun. 22, 2023

(30) Foreign Application Priority Data

Apr. 21, 2020  (SG) ............................ 10202003630V

(51) Int. Cl.
*H04L 9/08*  (2006.01)
*H04L 9/32*  (2006.01)

(52) U.S. Cl.
CPC .......... *H04L 9/0866* (2013.01); *H04L 9/3242* (2013.01); *H04L 9/3247* (2013.01)

(58) Field of Classification Search
CPC ... H04L 9/0866; H04L 9/3242; H04L 9/3247; H04L 2209/16; H04L 2463/082;
(Continued)

(56) References Cited

U.S. PATENT DOCUMENTS

| 8,739,264 | B1   | 5/2014 | Eddings et al. |
| 9,374,370 | B1 * | 6/2016 | Bent, II ............. H04W 12/068 |

(Continued)

FOREIGN PATENT DOCUMENTS

| CN | 108768664 | 11/2018 |
| CN | 109660542 | 4/2019 |

(Continued)

OTHER PUBLICATIONS

International Search Report for Application No. PCT/SG2021/050225, mailed Jul. 2, 2021, (3 pages).

(Continued)

*Primary Examiner* — Aravind K Moorthy
(74) *Attorney, Agent, or Firm* — Buckley, Maschoff & Talwalkar LLC

(57) ABSTRACT

A client communications device and method for generating a user message comprising an assertion for verification by a remote server device is described. Payload data for the user message as generated by a secure application resident on the communications device is received. Biometric authentication of the user is performed as a first level security mechanism. If biometric authentication of the user is successful, a digital signature is generated based on the message payload as a second level security mechanism. The digital signature is generated using a private signature key stored in a secure element of the client device. A third level security mechanism is applied by authenticating the user message using a secure application-specific key. In implementations, the digital signature is generated in a secure environment of (Continued)

the client device which has sole access to the secure element after successful biometric authentication. The user message comprising the message payload and the digital signature is generated for sending to the remote server device. The verification may be required during a financial transaction. A corresponding server communications device and method is also described.

10 Claims, 7 Drawing Sheets

(58) Field of Classification Search
CPC . H04L 9/0897; H04L 9/3231; H04L 63/0861; G06Q 20/3255; G06Q 20/38215; G06Q 20/40145; G06F 21/32; G06F 21/606
See application file for complete search history.

(56) References Cited

U.S. PATENT DOCUMENTS

| | | | | |
|---|---|---|---|---|
| 9,584,329 | B1* | 2/2017 | Trimberger | H04L 9/3278 |
| 9,584,530 | B1* | 2/2017 | Statica | H04L 9/0643 |
| 9,699,167 | B1* | 7/2017 | Tovino | H04L 63/0428 |
| 9,961,077 | B2* | 5/2018 | Lindemann | H04L 9/3231 |
| 10,038,715 | B1* | 7/2018 | Majkowski | H04L 63/1458 |
| 10,069,914 | B1* | 9/2018 | Smith | H04L 67/568 |
| 10,142,306 | B1* | 11/2018 | Shemesh | H04L 63/062 |
| 10,257,495 | B1* | 4/2019 | Poder | G06V 40/172 |
| 10,277,400 | B1* | 4/2019 | Griffin | H04L 9/3231 |
| 10,523,433 | B1* | 12/2019 | Monahan | H04L 9/088 |
| 10,776,102 | B1* | 9/2020 | Dsouza | G06F 21/83 |
| 10,778,435 | B1* | 9/2020 | Wimberley | H04L 9/30 |
| 10,797,888 | B1* | 10/2020 | Natarajan | H04L 63/0428 |
| 10,826,900 | B1* | 11/2020 | Poder | H04L 63/105 |
| 10,832,244 | B1* | 11/2020 | Chowdhury | G06Q 20/388 |
| 10,880,076 | B1* | 12/2020 | Blankstein | H04L 9/0866 |
| 10,909,830 | B1* | 2/2021 | Stapleford | H04W 4/90 |
| 10,936,300 | B1* | 3/2021 | Sun | G06F 16/2365 |
| 10,999,331 | B1* | 5/2021 | Marchand | H04L 41/0806 |
| 11,238,138 | B1* | 2/2022 | Ancheta | G06F 21/14 |
| 11,271,750 | B1* | 3/2022 | Popick | H04L 63/0442 |
| 11,330,003 | B1* | 5/2022 | Howell | H04L 63/1425 |
| 11,354,660 | B1* | 6/2022 | Griffin | G06Q 20/38215 |
| 11,436,597 | B1* | 9/2022 | Griffin | H04L 9/30 |
| 11,445,373 | B1* | 9/2022 | O'Connor | H04L 9/3247 |
| 11,615,199 | B1* | 3/2023 | Poder | G06F 21/6218 726/6 |
| 11,625,725 | B1* | 4/2023 | Williams | G06Q 20/409 705/71 |
| 2001/0037220 | A1* | 11/2001 | Merry | A61N 1/37264 704/E15.044 |
| 2002/0144128 | A1 | 10/2002 | Rahman et al. | |
| 2003/0009660 | A1* | 1/2003 | Walker | H04L 63/04 713/153 |
| 2003/0135740 | A1 | 7/2003 | Talmor et al. | |
| 2004/0128502 | A1* | 7/2004 | Royer | G06F 21/32 713/156 |
| 2005/0069131 | A1* | 3/2005 | de Jong | H04N 21/6581 380/278 |
| 2006/0010074 | A1* | 1/2006 | Zeitsiff | H04N 21/2347 705/52 |
| 2007/0112578 | A1* | 5/2007 | Randle | H04L 63/0272 713/156 |
| 2008/0162943 | A1* | 7/2008 | Ali | H04L 9/3234 713/185 |
| 2009/0067687 | A1* | 3/2009 | Boshra | G06V 40/12 382/124 |
| 2009/0086964 | A1* | 4/2009 | Agrawal | G06F 21/6218 713/189 |
| 2010/0250944 | A1* | 9/2010 | Suzuki | H04L 63/0861 713/172 |
| 2010/0322416 | A1* | 12/2010 | Aldis | H04L 9/0894 380/44 |
| 2011/0016327 | A1 | 1/2011 | Suzuki et al. | |
| 2013/0086393 | A1* | 4/2013 | Pogmore | G06F 16/81 713/189 |
| 2013/0091353 | A1* | 4/2013 | Zhang | H04L 9/3268 713/156 |
| 2013/0263212 | A1 | 10/2013 | Faltyn et al. | |
| 2013/0318359 | A1* | 11/2013 | Morris | H04L 9/3257 713/185 |
| 2014/0089202 | A1* | 3/2014 | Bond | H04L 9/14 713/166 |
| 2014/0169193 | A1* | 6/2014 | Eder | H04L 63/123 370/252 |
| 2014/0250511 | A1* | 9/2014 | Kendall | G06F 21/44 726/6 |
| 2015/0154031 | A1* | 6/2015 | Lewis | G06F 21/575 713/2 |
| 2016/0065370 | A1* | 3/2016 | Le Saint | H04L 9/0891 713/155 |
| 2016/0092871 | A1* | 3/2016 | Gordon | H04W 4/06 705/44 |
| 2016/0140545 | A1* | 5/2016 | Flurscheim | H04L 9/3234 705/76 |
| 2016/0173281 | A1* | 6/2016 | White | H04W 12/06 713/193 |
| 2016/0218875 | A1* | 7/2016 | Le Saint | H04L 9/0822 |
| 2016/0277930 | A1* | 9/2016 | Li | H04L 41/28 |
| 2016/0380985 | A1* | 12/2016 | Chhabra | H04L 63/061 713/171 |
| 2017/0091458 | A1* | 3/2017 | Gupta | H04L 9/3247 |
| 2017/0366525 | A1* | 12/2017 | Takagi | H04L 63/0442 |
| 2018/0091500 | A1* | 3/2018 | Baty | G06K 7/10009 |
| 2018/0102886 | A1* | 4/2018 | Yamada | H04L 1/0005 |
| 2018/0152839 | A1* | 5/2018 | Arribas | H04L 63/083 |
| 2018/0157868 | A1* | 6/2018 | Karivaradaswamy | G06F 21/78 |
| 2018/0212772 | A1* | 7/2018 | Leavy | H04L 9/085 |
| 2018/0293843 | A1* | 10/2018 | Thornton | G06Q 30/0613 |
| 2018/0343123 | A1 | 11/2018 | Liu et al. | |
| 2019/0005219 | A1* | 1/2019 | Matsuda | H04L 9/3231 |
| 2019/0005493 | A1* | 1/2019 | Francesco | H04L 9/0822 |
| 2019/0052468 | A1 | 2/2019 | Ngoc-Ai Lu | |
| 2019/0098078 | A1* | 3/2019 | Dhuse | H04L 67/5681 |
| 2019/0139009 | A1 | 5/2019 | Ikeuchi | |
| 2019/0147440 | A1* | 5/2019 | Deliwala | G06Q 20/3821 705/71 |
| 2019/0158702 | A1 | 5/2019 | Shirakawa | |
| 2019/0230063 | A1* | 7/2019 | McCready | H04L 63/08 |
| 2019/0238524 | A1* | 8/2019 | Copty | H04L 9/083 |
| 2019/0245894 | A1* | 8/2019 | Epple | H04L 63/1483 |
| 2019/0268315 | A1* | 8/2019 | Miller | H04L 9/0891 |
| 2019/0303808 | A1* | 10/2019 | Konstam | H04W 76/10 |
| 2019/0305955 | A1* | 10/2019 | Verma | H04L 9/3247 |
| 2019/0312733 | A1* | 10/2019 | Engan | H04L 63/126 |
| 2019/0327223 | A1* | 10/2019 | Kumar | H04L 63/0853 |
| 2019/0349203 | A1* | 11/2019 | Scherrer | H04L 9/3239 |
| 2019/0372777 | A1* | 12/2019 | Choi | H04L 9/30 |
| 2019/0385096 | A1* | 12/2019 | Ibrahim | H04W 4/024 |
| 2019/0385392 | A1* | 12/2019 | Cho | G07C 9/00309 |
| 2020/0013051 | A1* | 1/2020 | Kadiwala | H04L 63/068 |
| 2020/0059780 | A1* | 2/2020 | Hess | H04W 12/041 |
| 2020/0159543 | A1* | 5/2020 | Novoa | G06F 11/0757 |
| 2020/0160346 | A1* | 5/2020 | Sethi | G06Q 20/40145 |
| 2020/0162255 | A1* | 5/2020 | Hunt | H04L 63/083 |
| 2020/0167502 | A1* | 5/2020 | Lee | H04L 9/3236 |
| 2020/0204370 | A1* | 6/2020 | Wisniewski | H04L 9/3247 |
| 2020/0244467 | A1* | 7/2020 | Thambundit, IV | H04L 9/3268 |
| 2020/0279139 | A1* | 9/2020 | Collins | G06F 21/6218 |
| 2020/0349296 | A1* | 11/2020 | Young | G09C 5/00 |
| 2020/0356978 | A1* | 11/2020 | Bhoiwala | G06Q 20/326 |
| 2020/0374130 | A1* | 11/2020 | Strong | H04L 9/006 |
| 2020/0412545 | A1* | 12/2020 | Liu | G06F 21/71 |
| 2021/0099308 | A1* | 4/2021 | Abbas | H04L 9/3242 |
| 2021/0110357 | A1* | 4/2021 | Wisniewski | G06Q 50/167 |
| 2021/0149824 | A1* | 5/2021 | Satpathy | G06T 19/006 |
| 2021/0194685 | A1* | 6/2021 | Patel | H04L 9/0866 |
| 2021/0203568 | A1* | 7/2021 | Yu | H04L 63/1408 |
| 2021/0216618 | A1* | 7/2021 | Krejci | G06F 21/36 |
| 2021/0216644 | A1* | 7/2021 | Soman | H04L 9/0825 |
| 2021/0226779 | A1* | 7/2021 | Ruane | G06F 12/1408 |

(56) References Cited

U.S. PATENT DOCUMENTS

2021/0243035 A1* 8/2021 Ruane .................. H04L 9/0897
2021/0377263 A1* 12/2021 Law ..................... H04L 9/3073
2022/0300962 A1* 9/2022 Zia ....................... G06Q 20/326
2022/0358185 A1* 11/2022 Newman .............. G06F 16/211

FOREIGN PATENT DOCUMENTS

EP        3185159       6/2017
EP        3343831       7/2018

OTHER PUBLICATIONS

International Preliminary Report on Patentability for Application No. PCT/SG2021/050225, mailed Dec. 21, 2021, (3 pages).
Onyesolu et al., "Improving Security Using a Three-Tier Authentication for Automated Teller Machine (ATM)", I. J. Computer Network and Information Security, 2017, No. 10, pp. 50-52.

* cited by examiner

AUTHENTICATION AND VALIDATION PROCEDURE FOR IMPROVED SECURITY IN COMMUNICATIONS SYSTEMS

TECHNICAL FIELD

The invention relates generally to the field of communications. One aspect of the invention relates to techniques for user authentication in communications systems. Another aspect of the invention relates to techniques for validating communications. Yet another aspect of the invention relates to a security module and client application implemented on a client device for providing assertions to a server device for authentication or validation. The invention is particularly, although not exclusively, applicable to the authentication or validation of user assertions during financial transactions over a communications network.

BACKGROUND

In communications systems, a user of a client device is frequently required to provide authentication information over a communications network, in order to communicate and perform online transactions with a server device. Authentication information is used to verify the identity of the user, in order to verify that the user is genuine and is authorised to access the server device and perform a transaction. Authentication of a user may be necessary for transactions that allow access to confidential data over the communications network, transactions that authorize financial payment over the communications network and so on. Authentication information can be in the form of traditional user credentials, such as a username and a password known only to the user. However, traditional user credentials are vulnerable to theft, being cracked and other forms of attack. Thus, authentication techniques that rely solely on user credentials do not reliably verify a user, for example with a desired level of confidence. More sophisticated authentication techniques require the user to enter a one-time password (OTP), which is sent in real time by the server device to the user's device, to provide a second level of user authentication. However, authentication techniques that rely on an OTP may be vulnerable to hijack by fraudulent devices and applications.

Thus, existing authentication techniques may not be able to verify a user with sufficient reliability or confidence for some purposes, such as communications involving higher value transactions or transactions on user accounts that are considered to require enhanced security, such as transactions at high risk of fraudulent activity.

SUMMARY

Aspects of the invention are as set out in the independent claims. Some optional features are defined in the dependent claims.

Implementation of the techniques disclosed herein may provide significant technical advantages. In particular, the techniques lead to more reliable user authentication and validation of security information for improved security in communications systems and networks.

In example implementations, a security module of a client application on a client device leads to more reliable user authentication by performing biometric authentication as a prerequisite to the generation of user messages. The message payload is signed by generating a digital signature using a private key of a public-private signature key pair, which can only be accessed after successful biometric authentication. This creates a binding association between the biometric information of the user and the cryptographic signature key pair used to confirm the sender of the message and verify the integrity thereof. An authentication and security module of a server device, for example an authentication server, is able to authenticate the sender of the message with a greater degree of confidence, simply by validating the signature attached to the message payload using the public signature key of the signature key pair. Further, use of a third level security mechanism such as an encryption mechanism using an application-specific key as described below which makes use of an obfuscated encryption key may help to guarantee to provide validation that the message originated from a genuine security module associated with the application with a greater degree of confidence, and may reduce the risk of fraudulent apps hijacking the authentication processes.

In some implementations, the digital signature is generated in a secure environment, such as a Trusted Execution Environment, of the client device. Access to the private signature key is limited solely to the secure environment of the communications device. This further enhances the security and integrity of user messages sent by the client device.

In example implementations, the security module of the client application encrypts user messages with an encryption key, prior to sending to the server device. Successful decryption of a received user message by the authentication server using the corresponding decryption key enables validation that the message originated from a genuine security module associated with the application with a greater degree of confidence.

Accordingly, in at least some implementations, the techniques disclosed herein facilitate improved user authentication and security information validation, leading to improved security in communications systems compared to existing techniques, by implementing a three-stage procedure in a client application running on a client device. Further details are described below.

In implementations, the functionality of the techniques disclosed herein may be implemented in software running on a handheld communications device, such as a mobile phone (herein also referred to as "user device" or "client device"). The software which implements the functionality of the techniques disclosed herein may be contained in a client application known as an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish a communications channel with an authentication server as described herein.

BRIEF DESCRIPTION OF THE DRAWINGS

Implementations of the present disclosure will now be described, by way of example only, and with reference to the accompanying drawings in which.

Figure 1:
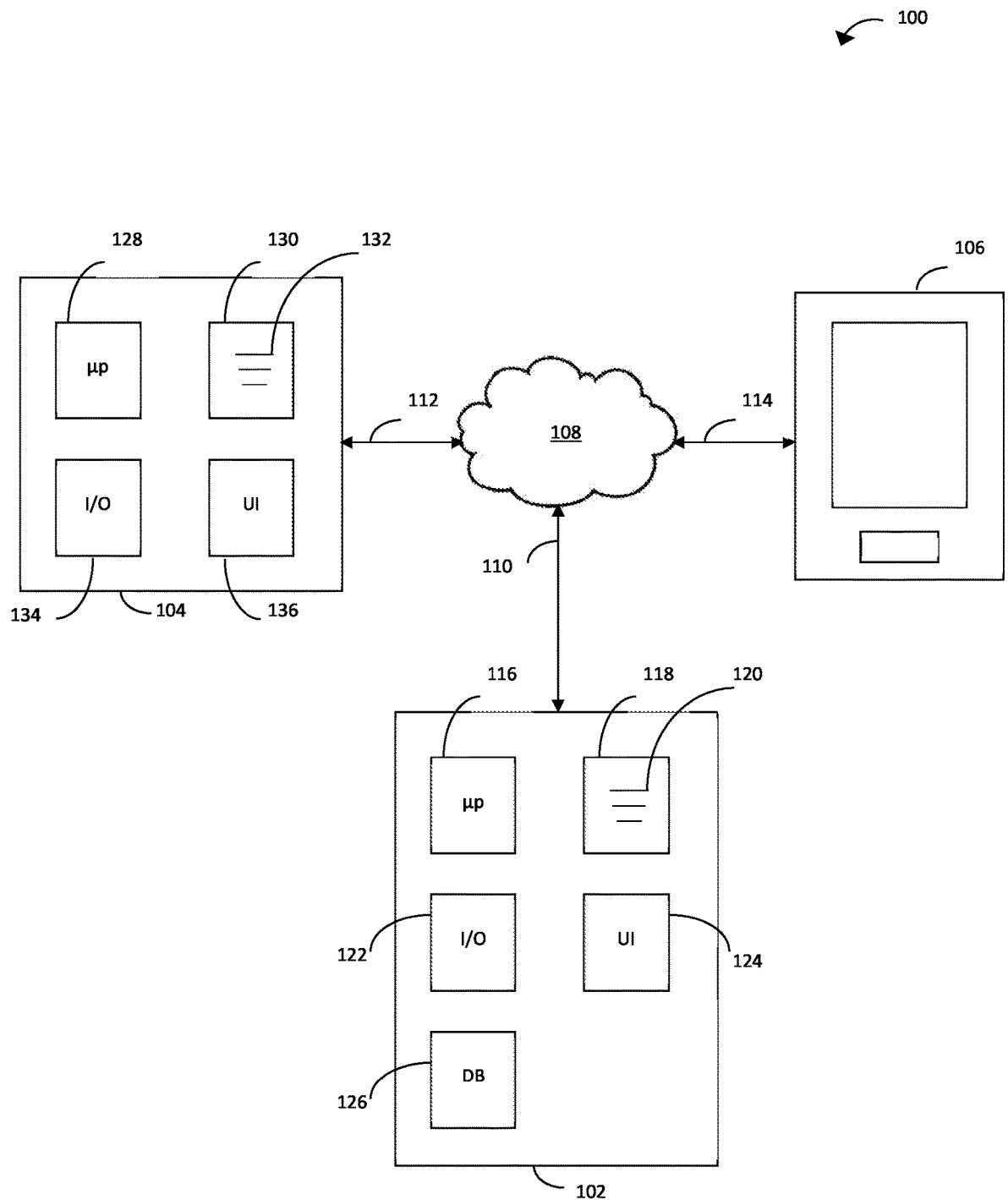
FIG. 1 is a schematic block diagram illustrating a communications system comprising a server device for authenticating a user of a client device in accordance with example implementations of the present disclosure.

In the drawings, similar reference signs are used to denote similar features.

DETAILED DESCRIPTION

Referring first to FIG. 1, a communications system 100 is illustrated. Communications system 100 comprises communications server apparatus (server device) 102, a first client communications apparatus (first client device) 104 and a second client communication apparatus (second client device) 106 connected to a communications network 108 (for example the Internet) through respective communications links 110, 112, 114 implementing, for example, internet or other data communications protocols. Communications network 108 may comprise any wired and/or wireless communications network or combination of networks. Thus, client devices 104, 106 may be able to communicate with server device 102 through various communications networks, such as public switched telephone networks (PSTN networks), mobile cellular communications networks (3G, 4G or LTE networks), local wired and wireless networks (LAN, WLAN, WiFi networks) and the like.

Figure 3:
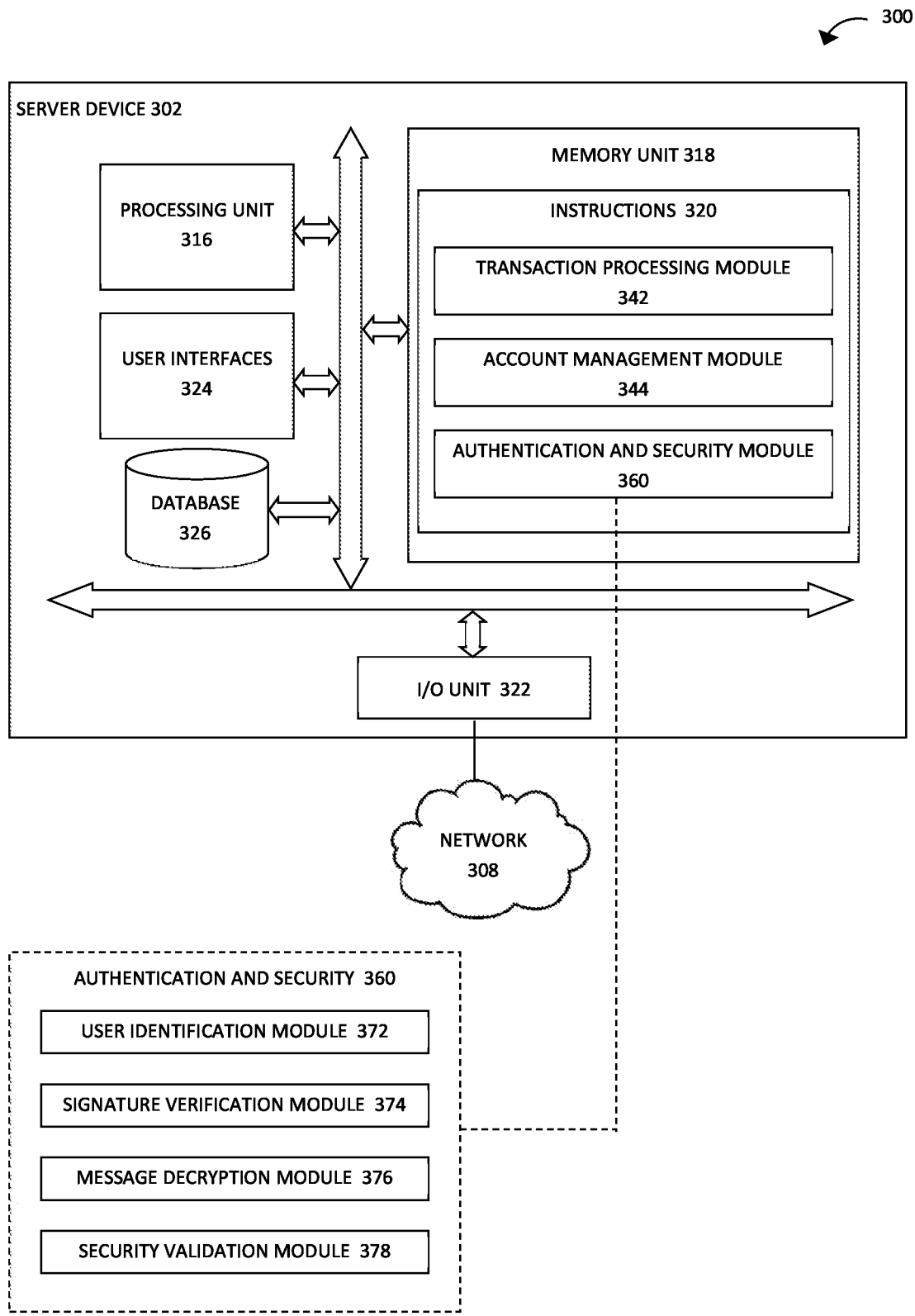
FIG. 3 is a schematic block diagram illustrating a server device comprising secure authentication functionality in accordance with example implementations of the present disclosure.

Server device 102 may be a single server as illustrated schematically in FIG. 1, or its functionality may be distributed across multiple servers. For example, server device 102 may comprise multiple servers including, for example, an authentication server for providing user authentication/security functionality, an account server for providing user account management functionality and a web server for providing user transaction processing functionality. One such arrangement is illustrated in FIG. 3, which is discussed in further detail below. In the example of FIG. 1, server device 102 may comprise a number of individual components including, but not limited to, one or more microprocessors 116, a memory 118 (e.g. a volatile memory such as a RAM) for the loading of executable instructions 120, the executable instructions defining the functionality of the server 102 carries out under control of the processor 116. Server device 102 also comprises an input/output (I/O) module 122 allowing the server to communicate over the communications network 108. User interface 124 is provided for user control and may comprise, for example, computing peripheral devices such as display monitors, computer keyboards and the like. Server device 102 may also comprise a database 126, the purpose of which will become readily apparent from the following discussion.

First client device 104 may comprise a number of individual components including, but not limited to, one or more microprocessors 128, a memory 130 (e.g. a volatile memory such as a RAM) for the loading of executable instructions 132, the executable instructions defining the functionality the client device 104 carries out under control of the processor 128. First client device 104 also comprises an I/O module 134 allowing the client device 104 to communicate over the communications network 108. User interfaces 136 are provided for user control. If the first client device 104 is, say, a portable communications device such as a smart phone or tablet device, the user interfaces 136 will have a touch panel display as is prevalent in many smart phone and other handheld devices. Alternatively, if the first client device is, say, a desktop or laptop computer, the user interface may have, for example, computing peripheral devices such as display monitors, computer keyboards and the like. User interfaces 136 may also comprise a microphone and the like.

Second client device 106 may be, for example, a smart phone or tablet device with the same or a similar hardware architecture to that of first client device 104. In example implementations, first client device 104 may be a user device of a consumer of a service associated with server device 102, and second client device 106 may be a user device of a service provider of a service associated with server device 102. In other example implementations, first and second client devices 102, 104 may be user devices of the same or different categories of user associated with one or more functionalities of the server device 102.

Figure 2:
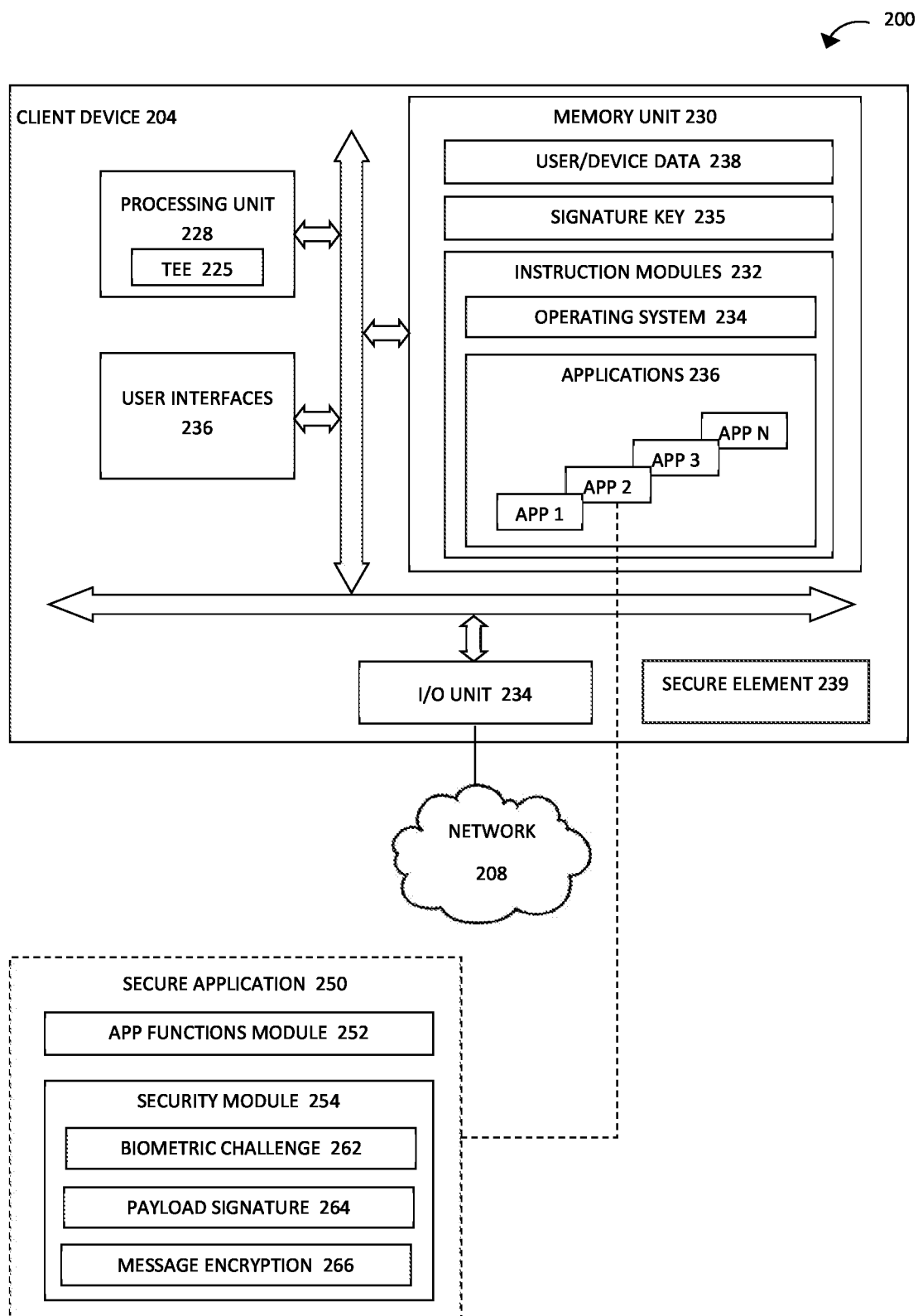
FIG. 2 is a schematic block diagram illustrating a client device comprising a secure client application in accordance with example implementations of the present disclosure.

FIG. 2 illustrates a client device 204 in accordance with example implementations of the present disclosure. For example, client device 204 may be used as first client device 106 or second client device 106 of the communications system 100 illustrated in FIG. 1. Client device 204 comprises processing unit 228, memory unit 230, I/O unit 234 and user interfaces 236, as described above in relation to FIG. 1. In addition, client device 204 may comprise other components (not shown) typically included in a portable communications device, such as a voice communications module, a camera, an accelerometer, a position locator (e.g., global navigation satellite system module) and the like.

Memory unit 230 stores a plurality of instruction modules 232 comprising executable instructions including operating system 234 and client applications ("apps") 236. In addition, memory unit 230 stores user and device data 238. Operating system 234 manages the overall operation of the client device 204 and provides common services for client applications 236. In accordance with the present disclosure, operating system 234 comprises biometric authentication functionality for device security, which limits access to the client device 204, for example, to a single biometrically authenticated user that has provided their biometric information on setup or subsequently. Examples of biometric authentication functionality of operating system 234 include fingerprint recognition, facial recognition, iris/retina recognition and the like. A user may initially provide biometric information using, for example, a camera of the client device 204 or a touchscreen of the client device 204 incorporating a fingerprint scanner. Mobile operating systems, such as Android and iOS of Apple Inc., typically include at least one biometric authentication functionality in addition to a traditional authentication functionality based on user credentials for security of the client device 204. Client device 204 further comprises a secure element 239, discussed in further detail below. While secure element 239 can be implemented in either hardware or software, in the example of FIG. 2, it is implemented in hardware.

Client applications 236 may comprise individual mobile applications that provide specific user functions in client device 204. Client applications 236 may also comprise web applications that communicate with a server device (not shown in this Figure) over a network to provide specific user functions that may involve secure communications, online transactions and the like as described herein. Client applications 236 may be pre-installed in client device 236 by the vendor, or may be downloaded and installed by the user from a so-called "App store".

During operation of client device 204, processing unit 228 executes instructions of operating system 234 and may execute one or more client applications 236, launched by the user and running on client device 204, under the control of operating system 234. Processing unit 228 may include one or more central processors, such as a microprocessor, including a Trusted Execution Environment (TEE) 225. TEE 225 comprises an isolated execution environment that provides security features as known in the art. Processing unit 228 may also comprise other processors such as a graphics processor, image processor and so on (not shown).

The illustrated client device 204 is installed with a secure application 250, which is typically downloaded and installed by a user as described above, in accordance with the present disclosure. In particular, secure application 250 comprises app functions module 252 and security module 254. App functions module 252 comprises instructions for executing the functionality of the client application (i.e., app functions), which includes data communications with an associated server device (not shown in this Figure) via I/O unit 234 over network 208. Examples of app functions include online shopping applications, online service booking applications, online banking applications and the like. Security module 254 comprises an integrated security engine that executes instructions that provide dedicated security functionality for secure application 250. In the illustrated secure application 250, security module 254 implements a three-layered security mechanism for the provision of user authentication and security information in data communications sent to the server device. In particular, biometric challenge module 262 provides a first level security mechanism, payload signature module 264 provides a second level security mechanism and message encryption module 266 provides a third level security mechanism. Biometric challenge module 262, payload signature module 264 and message encryption module 266 comprise data and instructions as described below. In an alternative arrangement, the third level security mechanism can be provided by application of a second digital signature. This may be a preferable solution if confidentiality of the user message—as may be provided if the third level security mechanism is an encryption mechanism—is not required.

Security module 254 implements a secure authentication procedure when a user operates secure application 250, and, in particular, sends an application transaction request or similar communication to the associated server device requiring user authentication. In particular, app functions module 252 may initiate the generation of a transaction request message in response to user entered data relating to the requested transaction. For example, the transaction may seek to order a service at a particular time and location, and so a user may enter data specifying the required service, time and location. App functions module 252 may determine that the particular transaction request message requires secure authentication before the transaction request is sent to the associated server device. Accordingly, app functions module 252 may trigger the secure authentication procedure of security module 254.

In a first stage of the authentication procedure, biometric challenge module 262 provides a biometric challenge to the user of the client device 204. In particular, biometric challenge module 262 may invoke the biometric authentication functionality of operating system 234, as described above. The biometric authentication functionality may provide a graphical user interface (GUI) requesting the user to provide biometric information, compare the biometric information provided by the user with prestored biometric information, and, if there is a match, validate the identity of the user. If the identity of the user is validated, the authentication procedure proceeds to a second stage.

In the second stage of the authentication procedure, payload signature module 264 provides a payload of the transaction request to the TEE 225. The payload includes data provided by the app functions module 252. The payload may further include additional data for enhanced security, including a key reference (as described below) and a combination of other user-specific data, such as a login token, that is unique to the user/secure application 250. TEE 225 adds a nonce and timestamp to the payload and securely signs the payload with a private "signature key", such as a private key of an Elliptic Curve Cryptography (ECC) private-public key pair or the like. The private ECC key is unique to the secure application 250 and is generated during an initial user enrolment procedure with the server device that provides the abovementioned key reference. The enrolment procedure is described in further detail below. The private ECC key is stored in a secure element of the client device 204. As is known, a secure element 239 comprises a secure component associated with a Trusted Execution Environment. The private ECC key/secure element is only accessible to the TEE 225 after successful biometric authentication in the first stage. Thus, the private ECC key is not accessible to any part of the secure application 250, including the payload signature module 264. The TEE 225 provides the signed payload to the message encryption module 266 for a third stage.

In the third stage of the authentication procedure, the message encryption module 266 encrypts the signed payload provided by TEE 225 with an "encryption key", such as a first key of an encryption key pair associated with the server device. The encryption key is included in the secure application 250 downloaded to the client device 204, and so may be considered as a "service encryption key". In example implementations, the service encryption key is obfuscated in the secure application 250 by suitable stenographic encoding techniques for securely encoding secret data. Thus, the service encryption key used for encryption by message encryption module 266 is not readily accessible from the code of the secure application 250 or vulnerable to attackers. As the skilled person will appreciate, the service encryption key is therefore secret, but is common to all genuine instances of secure application 250 running on different client devices for encrypting messages sent to the associated server device.

Upon completion of the third stage of the authentication procedure, the signed and encrypted transaction request message is sent by secure application 250 to associated server device for reliable authentication of the user and validation of the client device 204 and/or the secure application 250 as described herein.

Accordingly, the authentication procedure carried out by security module 254 in accordance with the described example implementations provides enhanced security for user transaction requests sent by secure application 250. In particular, the first stage authenticates the user by validating identity based on biometric information using operating system functionality of the client device 204. Thus, biometric information is securely retained on the client device 204, and a trust association is created between the user, client device 204 and secure application 250. The second stage may add unique user and/or device data to the payload, and the TEE 225 gains access to a secure private ECC key and signs the payload. Thus, the second stage provides hardware backed security to the signed payload after authentication of the user. The third stage encrypts the signed message using an obfuscated service encryption key. This guarantees that the message can only come from a genuine secure application 250, and reduces the risk of fraudulent apps hijacking the authentication processes.

FIG. 3 illustrates a server device 302 in accordance with example implementations of the present disclosure. For example, server device 302 may be associated with the secure application 250 of the client device 204 illustrated in FIG. 2. Server device 302 comprises processing unit 316, memory unit 318, I/O unit 322, user interfaces 324 and database 326, as described above in relation to FIG. 1.

Memory unit 318 stores a plurality of instruction modules 320 comprising executable instructions for performing server operations that process data communications, such as user transaction request messages, received from secure applications running on client devices (not shown in this figure) over network 308 via I/O unit 322. In particular, instruction modules 320 include transaction processing module 342, account management module 344 and authentication and security module 360.

During operation of server device 302, processing unit 316 executes instructions of transaction processing module 342, account management module 344 and authentication and security module 360 in response to user transaction request messages and other communications received from client devices (not shown in this figure) via I/O unit 322 over network 308. Processing unit 316 may include one or more central processors, such as a microprocessor.

Transaction processing module 342 performs processing associated with communications including user transaction requests received from secure applications, and generates transaction responses, accordingly. Account management module 342 performs processing to create and manage user accounts, which are stored in database 326. For example, account management module 344 may perform processing to create and/or manage a user account, such as during an enrolment procedure as described below with reference to FIG. 4. In addition, account management module 344 may associate information relating to received user transaction requests and other communications with user accounts, as described below with reference to FIG. 5. Authentication and security module 360 may perform processing associated with authentication and security functions in relation to received user transaction requests. For example, authentication and security module 360 may verify login credentials associated with the user. In addition, authentication and security module 360 may perform further authentication and security processes on received user transaction requests, as described herein.

In accordance with the present disclosure, authentication and security module 360 implements a security procedure for validating authentication and security information in data communications, such as user transaction requests, received from a secure application running on a client device as described herein. In particular, authentication and security module 360 implements the security procedure when receiving certain transaction requests requiring user authentication and validation. For example, such a transaction request may be generated by secure application 250 of client device 204 of FIG. 2, which has been processed in accordance with the first, second and third stages of the above described authentication procedure carried out by security module 254.

Accordingly, the security procedure of authentication and security module 360 of server device 302 mirrors aspects of the three-stage authentication procedure of security module 254 of the secure application 250 of client device 204. In particular, authentication and security module 360 comprises message decryption module 376, user identification module 372, signature verification module 374 and security validation module 378.

When the server device 302 receives a communication for validating authentication and security information, such as an encrypted and signed user transaction request, the message is passed to authentication and security module 360 for performing the security procedure.

In a first stage of the security procedure, message decryption module 376 decrypts the message with the second key of the encryption key pair described above, which is known only to the server device 320. The second key may be considered as a "service decryption key", as it is used for decrypting messages received from all instances of the associated secure application running on different client devices. Successful decryption of the message payload provides a guarantee that the message came from a genuine secure application, since the service encryption key used for encryption is obfuscated. The decrypted payload includes security data including a key reference. The decrypted payload may include one or more other user specific data, such as a login token, that is unique to the user/secure application, as described above.

In a second stage of the security procedure, signature verification module 374 looks up the public signature key, such as the public key of an Elliptic Curve Cryptography (ECC) private-public key pair described above, and verifies the signature applied to the payload. Signature verification confirms that the private ECC key signed the message payload. Furthermore, in implementations described herein, signature verification confirms that the payload was securely signed by the TEE using a secure element of the client device, as described below. Thus, signature verification verifies the client device and secure application that signed the message, and, in consequence, reliably authenticates the user due to the trust in the biometric authentication procedure necessarily performed by the secure application of the client device prior to signature.

In a third stage of the security procedure, which may occur at any time after the first stage, user identification module 372 may verify the user, and thus identify the user's account, for example from the decrypted user specific data such as login tokens, the identity of the secure application and/or client device.

In a fourth stage of the security procedure, which may also occur at any time after the first stage, security module 378 may perform other security checks such as checking the validity of the nonce, and the freshness of the message using the timestamp, included in the signed message payload.

In the above implementations, two key pairs are used for secure data communications between a secure application running on a client device and the associated server device.

One of the key pairs is the above described "signature key" pair (typically an asymmetric key pair) and the other key pair is the above described "service/encryption key" pair (a symmetric or asymmetric key pair). One of the two key pairs—the "service" key pair—is predetermined and included in the secure client application, and the other one of the two key pairs—the "signature" key pair—is generated by the client device during an enrolment procedure as described below.

Figure 4:
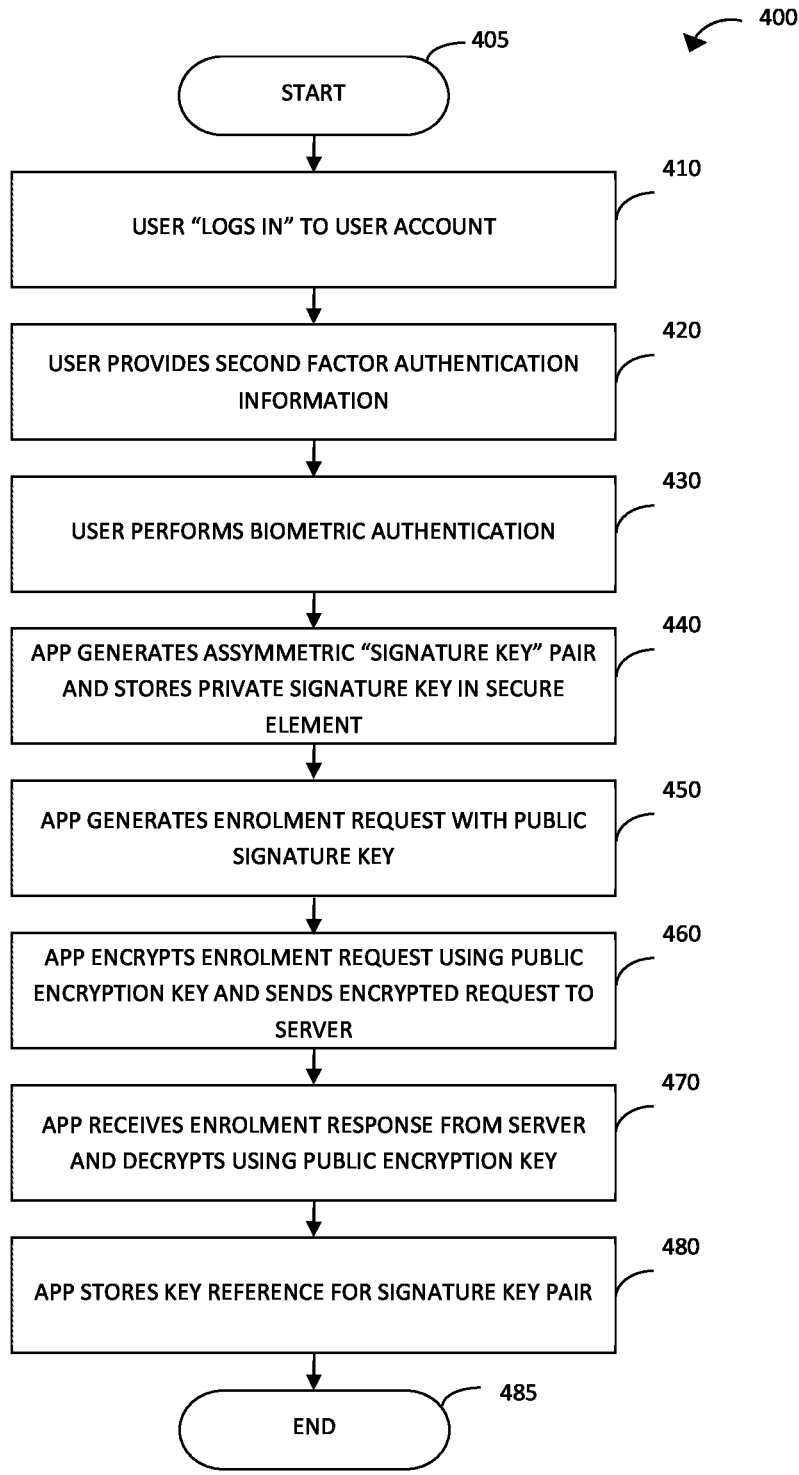
FIG. 4 is a flow diagram illustrating a method for enrolment of a user of a secure client application in a client device in accordance with example implementations of the present disclosure.

FIG. 4 is a flow diagram illustrating a method 400 for enrolment with a server device associated with a secure client application in accordance with example implementations of the present disclosure. For example, the method 400 may be performed by secure application 250 running on client device 204 of FIG. 2.

The enrolment method 400 is performed after installation of the secure application ("app") on the client device and before first use by the user. As indicated above, the secure application may be pre-installed on the client device or downloaded from an app store. In accordance with example implementations, secure application includes the service encryption key, which is obfuscated as described above, to be used by the secure application to encrypt data communications sent to the server device. For ease of description, in the following example, it is assumed that the user has already set up a user account with the server device associated with the secure application, and so is able to gain access to the account using conventional login credentials.

The method 400 starts at step 405. For example, method 400 may start in response to a user launching the secure application on the client device for the first time and interacting with a graphical user interface (GUI) of an enrolment screen of the secure application.

At step 410, the user logs in to their user account with the associated server device. For example, the user may enter login credentials, such as a username and password, which may be verified by an account management module associated with the server device. In addition, a one-time password may be sent to the user and successfully entered to complete the login procedure. Upon successful completion of the login procedure, the method proceeds to step 420.

At step 420, the user provides information for second factor authentication, for the purpose of validating presence of the user. In particular, the user may provide second factor identification information sufficient to assert that a user is present, such as entering a unique personal identification number (PIN) known only to the user or taking a "selfie" photograph. This may be used as a second level authentication to biometric authentication as described herein.

At step 430, the user performs biometric authentication on the client device in order to enroll for biometric authentication as described herein. In particular, the user is asked to provide biometric authentication information to a biometric authentication process of the operating system of the client device as described above. If biometric authentication is successful, the method proceeds to step 440.

At step 440, the method generates an asymmetric "signature key" pair, such as an ECC key pair as described above. Step 440 stores the private ECC key in a secure element of the client device, which is only accessible to the TEE of the client device following successful biometric authentication and is not accessible to other components of the client device. The private ECC key/secure element is stored for the purposes of signing a message payload. In example implementations, the private ECC key/secure element is invalidated if any of the security properties of the client device are changed, such as the device PIN and user biometric information used to gain access to the client device.

At step 450, the method generates an enrolment request message. Enrolment request message includes a payload message comprising the public ECC key generated in step 440 and the second factor identification information provided by the user in step 420. The payload may include additional information such as a nonce and a timestamp.

At step 460, the method encrypts the enrolment message with the (obfuscated) service encryption key, and sends the encrypted enrolment request to the associated server device for enrolment processing.

The server device comprises an authentication server which performs a security procedure, for validating authentication and security information, as part of the enrolment processing. In particular, the authentication server may perform the method described below with reference to FIG. 5. Briefly, the authentication server decrypts the payload using the private encryption key. The decrypted payload may be validated, for example by checking the nonce and timestamp, and validating the second factor authentication information for the user. The server device then stores the public ECC key with other user data, for example in the existing user account, and generates a corresponding "key reference" that uniquely identifies the signature ECC key pair. The service device them generates an encryption enrolment response message including the key reference. In implementations, the encryption enrolment response message may be encrypted using the private/service encryption key known only to the server device.

At step 470, the method receives the encryption enrolment response from the server device, and, if appropriate, may perform decryption of the message payload using the encryption key.

At step 470, the method stores the key reference for the ECC key pair contained in the encryption enrolment response message for use in subsequent instances of the authentication processes by the client device. The method then ends at step 485.

Figure 5:
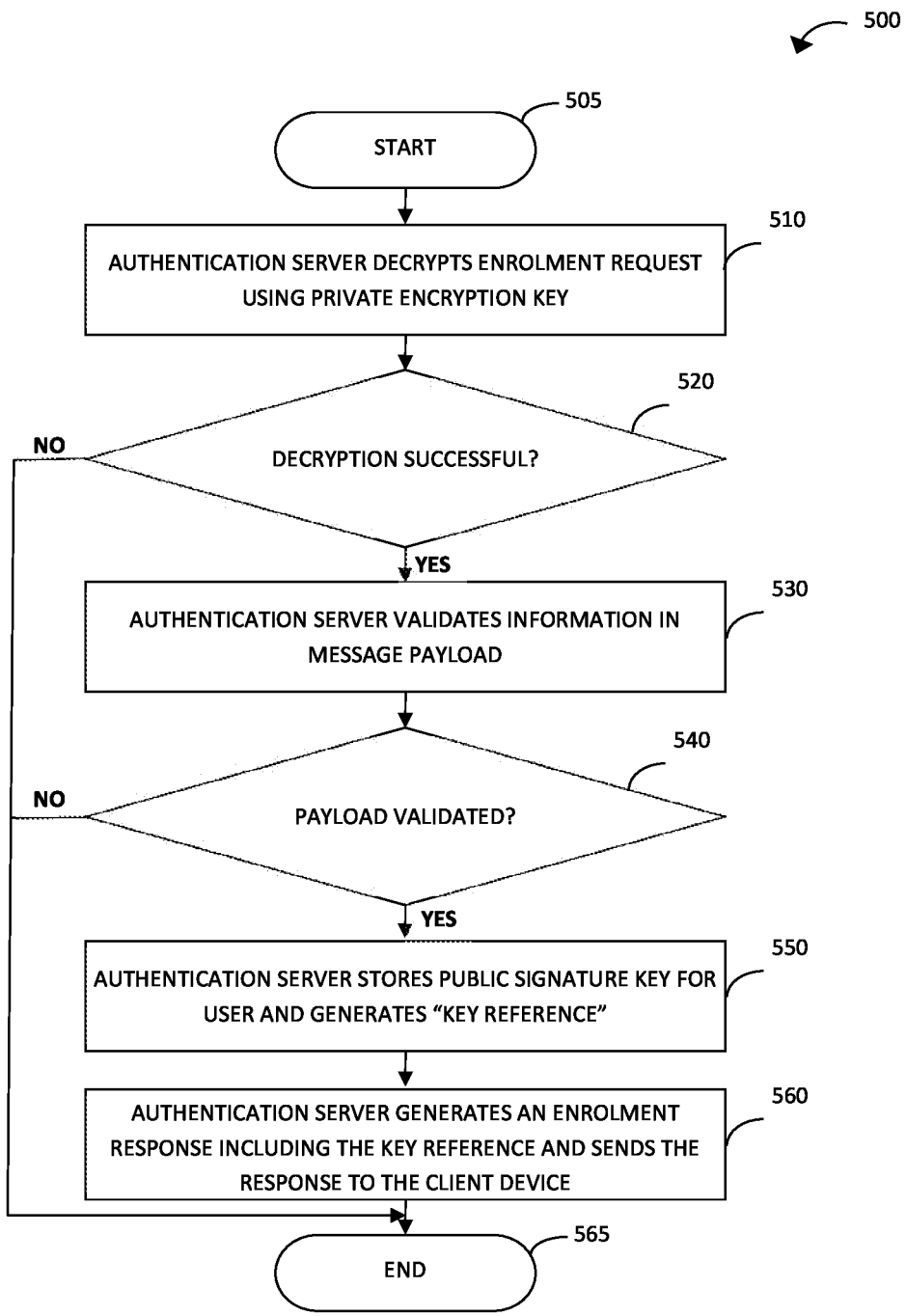
FIG. 5 is a flow diagram illustrating a method for enrolment of a user of a secure client application in a server device in accordance with example implementations of the present disclosure.

FIG. 5 is a flow diagram illustrating a method 500 for enrolment of a user of a secure client application by a server device in accordance with example implementations of the present disclosure. For example, the method 500 may be performed by authentication and security module 360 of server device 302 of FIG. 3. In the following description, for ease of reference, authentication and security module 360 is called an authentication server. The method 500 may be performed by the server device in conjunction with the method 400 of FIG. 4 performed by a client device. The method 500 performs a security procedure as part of the enrolment processing.

The method 500 starts at step 505. The method 500 may start in response to a server device receiving an enrolment request message from an associated secure application running on the client device, and passing the request to the authentication server.

At step 510, the authentication server decrypts the payload of the received enrolment request message using the service decryption key.

Step 520 considers whether the decryption in step 510 was successful. If step 520 determines that decryption was successful, the received enrolment request message originated from a genuine secure application on a client device and the method proceeds to step 530. Otherwise, the received request message fails the security procedure and the method ends at step 565.

At step 530, the authentication server validates the decrypted payload. For example, authentication server may check the validity of the nonce and freshness of the timestamp. Authentication server may validate second factor authentication information for the user.

Step 540 considers whether all validation checks performed in step 530 were successful such that the payload is validated. If step 540 determines that the decrypted payload is validated by all the validation checks in step 530, the received message passes the security procedure and the method proceeds to step 550. Otherwise, the received request fails the security procedure and the method ends at step 565.

At step 550, the authentication server stores the public ECC key contained in the decrypted payload, with other user data for the user, for example in the user account. In particular, the public ECC key is stored as the public signature key for validating the user/client device as described herein. In addition, the server generates a corresponding "key reference" that uniquely identifies the signature (ECC) public-private key pair. This completes the enrolment of the user and the secure application for use with biometric authentication as described herein.

At step 560, the authentication server generates an encryption enrolment response message including the key reference in the message payload, and sends the response to the client device. In implementations, the encryption enrolment response message may be encrypted using the service encryption key. The method ends at step 565.

Figure 6:
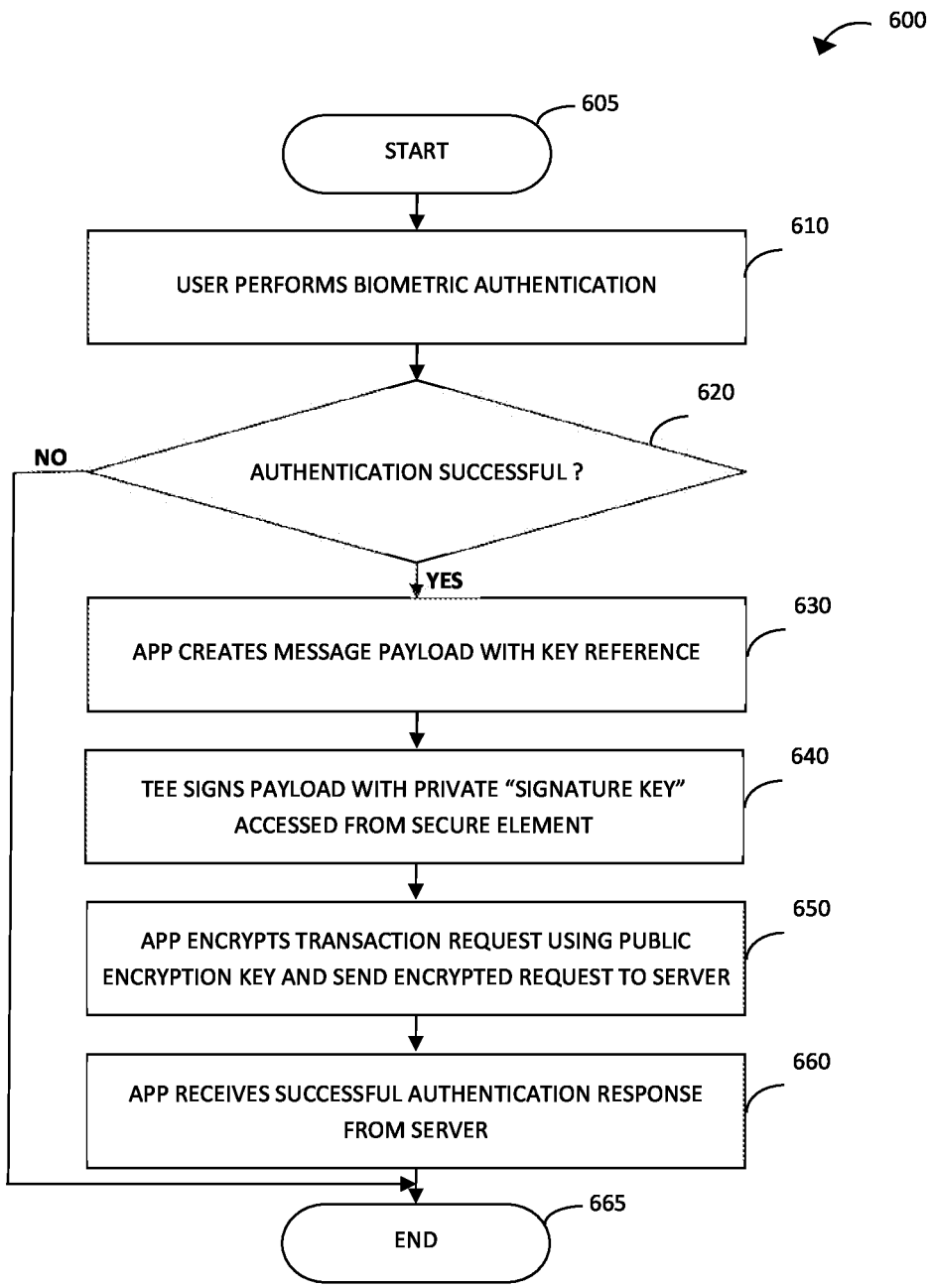
FIG. 6 is a flow diagram illustrating a method for authentication of a user of a secure client application in a client device in accordance with example implementations of the present disclosure.

FIG. 6 is a flow diagram illustrating a method 600 for authentication of a user with a server device associated with a secure client application in accordance with example implementations of the present disclosure. For example, the method 600 may be performed by secure application 250 running on client device 204 of FIG. 2. The method 600 may be performed when the secure application sends data communications, such as transaction requests and other messages that require authentication and validation, to the associated server device after the enrolment procedure of FIG. 4.

The method 600 starts at step 605. For example, method 600 may start in response to the user launching the secure application on the client device, logging in to the user account and entering user data for a transaction request (i.e., transaction information) using a graphical user interface (GUI) of an associated screen of the secure application. In some implementations, method 600 may be triggered by certain types of user transactions, such as all or relatively high value financial transactions (e.g., the use authorizes a financial payment). In other implementations, method 600 may be triggered for some or all user transactions of a user or client device that has been identified as requiring additional security, such as having a high risk of fraud. Thus, step 605 may include receiving user input transaction information for forming at least part of a payload of a transaction request message.

At step 610, the user performs biometric authentication. In particular, the user is asked by the secure application to provide biometric authentication information to a biometric authentication process of the operating system of the client device as described above.

At step 620, the method determines whether the biometric authentication in step 610 was successful. If step 620 determines that the biometric authentication in step 610 was successful, the method proceeds to step 630. However, if step 630 determines that the biometric authentication in step 610 was not successful, the user may be notified that the transaction request is cancelled and the method ends at step 665.

At step 630, the secure application creates a transaction request message payload and provides it to the TEE of the client device. In particular, the secure application creates a payload including the user input transaction information and the above described key reference. The payload may include additional information such as the user's primary login information and optionally second factor authentication information entered by the user. In example implementations, the payload includes a combination of user-data, such as a login token, that is unique to the user secure application, as described above.

At step 640, the TEE may add a nonce and a timestamp to the payload and securely signs the payload with a private signature (ECC) key stored in a secure element of the client device. For example, TEE may generate a digital signature by hashing the message payload to create a hash value and encrypting the hash value with the private (ECC) signature key/secure element, and may add the digital signature to securely sign the message. Since step 620 determined that the biometric authentication in step 610 was successful, TEE is able to gain access to the private ECC key/secure element of the client device as described above. In some implementations, the key reference is added to the message payload after the TEE has generated the digital signature of the message payload. The method then proceeds to step 650.

At step 650, the secure application encrypts the signed transaction request message with the service encryption key, and sends the encrypted request to the associated server device for processing the transaction request.

The server device may comprise an authentication server which performs a security procedure as part of the transaction request processing. In particular, the authentication server may perform the method described below with reference to FIG. 7. Briefly, the authentication server decrypts the payload using the decryption key (i.e., the service decryption key). Since the decrypted payload includes the key reference, the server can look up the associated public signature key and validate the signature. The authentication server may perform other security processes using other information in the decrypted payload, such as checking the nonce and timestamp, and validating any primary or second factor authentication against an associated identifier for the user. Upon successful completion of the security procedure, the authentication server may generate a token that is returned to the secure application of the client device (or, alternatively, change the session state accordingly). The server device is then able to proceed to process the transaction request.

At step 660, the secure application may receive a response from the server device, confirming successful authentication. The method then ends at step 665.

Accordingly, there is provided a client communications device for generating a user message comprising an assertion for verification by a remote server device. The communications device comprises a processor and a memory. The communications device is configured, under control of the processor, to execute instructions stored in the memory to: receive payload data for the user message; perform biometric authentication of the user, the biometric authentication comprising receiving input biometric information from the user and validating the input biometric information against biometric information for the user previously stored in the memory; in response to successful biometric authentication of the user, generate a digital signature based on the message payload, wherein the digital signature is generated using a private signature key stored in a secure element of the communications device, wherein the private key is accessible only when the biometric authentication of the user is successful, and generate the user message for sending to the remote device, the user message comprising the message payload and the digital signature. A corresponding method is also provided.

Figure 7:
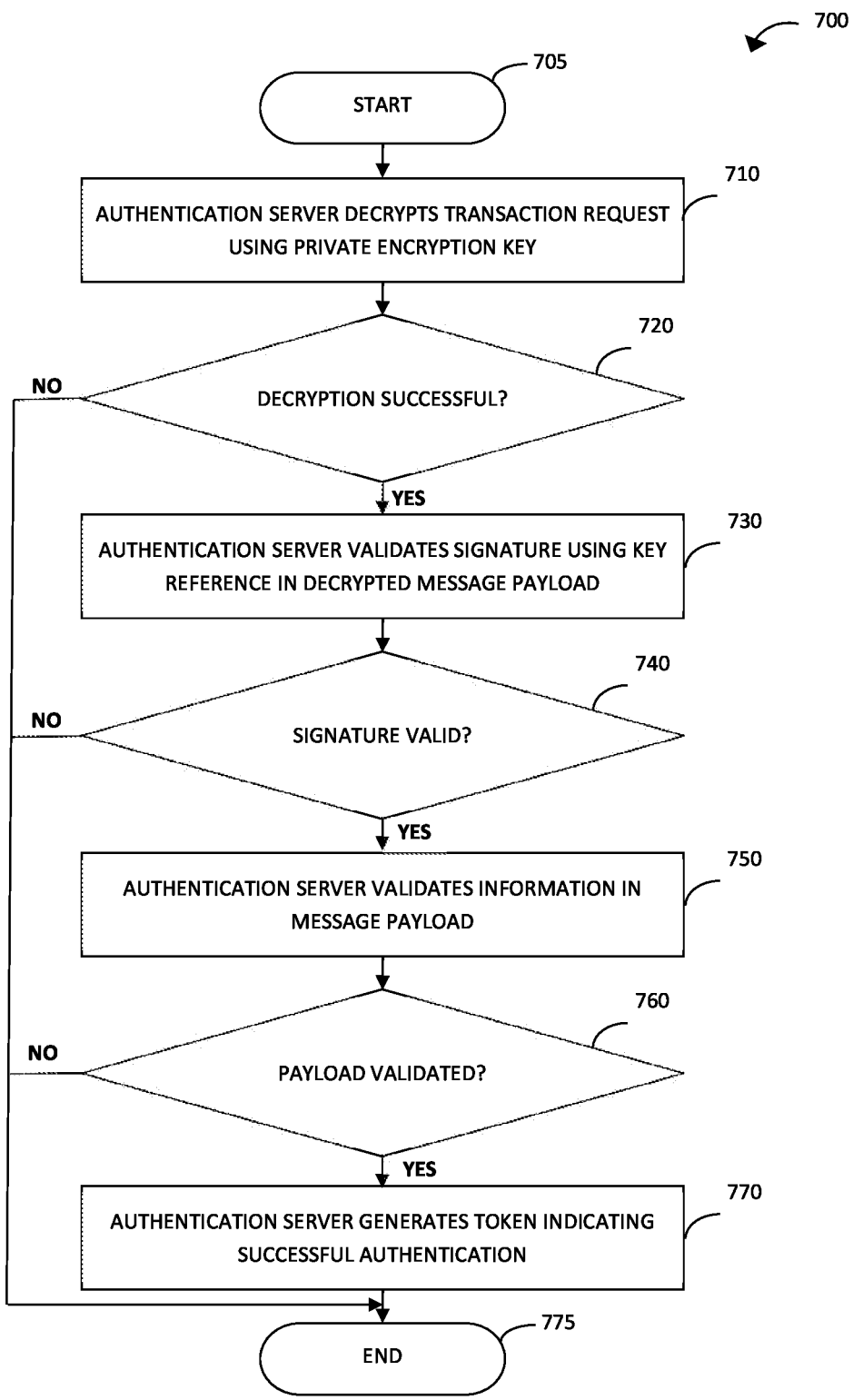
FIG. 7 is a flow diagram illustrating a method for authentication of a user of a secure client application in a server device in accordance with example implementations of the present disclosure.

FIG. 7 is a flow diagram illustrating a method 700 for authenticating and validating transaction requests of a user of a secure client application by a server device in accordance with example implementations of the present disclosure. For example, the method 700 may be performed by authentication and security module 360 of server device 302 of FIG. 3. In the following description, for ease of reference, authentication and security module 360 is called an authentication server. The method 700 may be performed by the server device in conjunction with the method 600 of FIG. 6 performed by a client device. The method 700 performs a security procedure prior to processing a received transaction request.

The method 700 starts at step 705. The method 700 may start in response to a server device receiving a transaction request message from an associated secure application running on the client device, and passing the request to an authentication server.

At step 710 the authentication server decrypts the message payload of the received transaction request message using the service decryption key.

Step 720 considers whether the decryption in step 710 was successful. If step 720 determines that decryption in step 710 was successful, the received transaction request message originated from a genuine secure application on a client device and the method proceeds to step 730. Otherwise, the received request message fails the authentication and security procedure and the method ends at step 775.

At step 730, the authentication server uses the key reference included in the decrypted message payload to look up the associated public signature ECC key and validates the signature of the signed payload. For example, the authentication server may generate a digital signature using the public ECC key based on the message payload, and compare the generated signature with the received signature in the signed payload; if the comparison indicates a match, the signature in the message is valid.

Step 740 considers whether the signature was validated in step 730. If step 740 determines that the signature is valid, the method can trust that the user has been biometrically authenticated at the client device and the method proceeds to step 750. Otherwise, the received request message fails the authentication and security procedure and the method ends at step 775.

At step 750, the authentication server validates the decrypted payload. For example, the authentication server may check the validity of the nonce and freshness of the timestamp, and may validate second factor authentication information and the like for the user.

Step 760 considers whether all validation checks performed in step 750 were successful such that the payload is validated. If step 760 determines that the decrypted and signature-verified payload is validated by all the validation checks in step 750, the received request message passes the security procedure and the method proceeds to step 770. Otherwise, the received request fails the security procedure and the method ends at step 575.

At step 770, the authentication server generates a token, which may be returned to the secure application of the client device, indicating that the received message has passed the authentication and security checks (or, alternatively, the session state is changed accordingly). The server device is then able to proceed to process the transaction request. The method then ends at step 775.

Accordingly, there is provided a server communications device for verifying an assertion in a user message received from a remote client device. The communications device comprises a processor and a memory. The communications device is configured, under control of the processor, to execute instructions stored in the memory to: validate a digital signature in the payload of the received user message, using a public signature key and the message payload, and if the digital signature is validated, determine that the user of the remote device has been biometrically authenticated at the remote device. In example implementations, the communications device is further configured, under control of the processor, to execute instructions stored in the memory to: identify a key reference in the payload of the received user message, and look up the public signature key corresponding to the key reference stored in memory of the communications device.

In summary, a client communications device and method for generating a user message comprising an assertion for verification by a remote server device is described. Payload data for the user message is received. Biometric authentication of the user is performed. If biometric authentication of the user is successful, a digital signature is generated based on the message payload. The digital signature is generated using a private signature key stored in a secure element of the client device. In implementations, the digital signature is generated in a secure environment of the client device which has sole access to the secure element after successful biometric authentication. The user message comprising the message payload and the digital signature is generated for sending to the remote server device. A corresponding server communications device and method is also described.

The example implementations of the present disclosure described herein enable improved security in communication systems. In particular, a binding association is created between biometric authentication of the user and a signature of a signed assertion (message payload), since a valid signature can only be applied upon successful biometric authentication. Thus, a server can trust that the user has been biometrically authenticated merely upon successful validation of the signature applied to the assertion (message payload). The use of biometric authentication provides a simpler, more secure and low-cost solution in authentication scenarios, by leveraging existing functionality of the client device. Any form of biometric authentication is possible, which may be selected by the user during enrolment. Thus, the described secure application may be implemented on any type of client device from entry-level to high-end, provided at least one form of biometric authentication mechanism is available. The use of biometric authentication is more convenient to the user since it does not rely on remembering detailed user credentials. The binding association is additionally hardware backed, since assertions are signed in a secure environment, such as the TEE, of the client device.

Furthermore, signed assertions such as user transaction request messages are encrypted prior to communication. Encryption security is enhanced since the encryption key is obfuscated; non-genuine applications are therefore unable to validly perform encryption without being detected by the server device.

Finally, some example implementations include other security features, such as a nonce and/or timestamp, and/or a combination of data that is unique to the user/secure application, in the message payload for verification. This enhances security against fake applications/devices and banned users, which can be automatically detected by the security procedure performed at the server device. Thus, the three-level security mechanism in accordance with the present disclosure more robustly prevents improper access to user accounts and minimises the possibility of successful account takeover by attackers.

Aspects of the present disclosure are described herein with reference to flow diagrams. It will be understood that the steps in the illustrated implementations are by way of example. The steps may be carried out in any suitable order, and some of the steps may be omitted accordingly to application requirements. It will be understood that the steps of the flow diagrams, and combinations of steps, can be implemented by computer readable program instructions.

It will be appreciated that the invention has been described by way of example only. Various modifications may be made to the techniques described herein and their equivalents without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications device for generating a user message comprising an assertion for verification by a remote device, the communications device comprising a processor and a memory, the communications device being configured, under control of the processor, to execute instructions stored in the memory to:
   receive a message payload for the user message, the message payload having been generated by a secure application resident on the communications device;
   apply a first level security mechanism of biometric authentication of the user, the biometric authentication comprising receiving input biometric information from the user and validating the input biometric information against biometric information for the user previously stored in the memory;
   in response to successful biometric authentication of the user, apply a second level security mechanism to generate a digital signature based on the message payload, wherein the digital signature is generated using a private signature key stored in a secure element of the communications device during an enrolment process, wherein the private key is accessible only when the biometric authentication of the user is successful;
   generate the user message for sending to the remote device, the user message comprising the message payload and the digital signature;
   apply a third level security encryption mechanism by authenticating the user message using a secure application-specific encryption key; and
   encrypt the user message with the encryption key, wherein the encryption key is obfuscated in memory associated with the instructions in the communications device;
   wherein the enrolment process includes generating an enrolment message comprising an assertion for verification by the remote device and the communications device is configured to:
   receive payload data for the enrolment message, in response to authentication of the user by the remote device;
   perform biometric authentication of the user;
   in response to successful biometric authentication of the user, generate an asymmetric signature key pair comprising the private signature key for generating the digital signature and a corresponding public signature key;
   store the private signature key in the secure element, and
   generate the enrolment message for sending to the remote device, the enrolment message comprising the payload data and the public signature key.

2. The communications device as claimed in claim 1, configured for the digital signature to be generated in a secure environment of the communications device.

3. The communications device as claimed in claim 2, configured for access to the private signature key to be limited solely to the secure environment of the communications device.

4. The communications device as claimed in claim 1, configured for the message payload to comprise one or more of: a key reference; user authentication data; client device identity data, and client application data, and/or configured for the user message to further comprise one or more of: a nonce and a timestamp.

5. The communications device as claimed in claim 1, configured for the digital signature to be generated by hashing the message payload to create a hash value, and encrypting the hash value with the private signature key to generate the digital signature.

6. The communications device as claimed in claim 1, wherein the communications device is further configured, under control of the processor, to execute instructions stored in the memory to:
   encrypt the enrolment message with the encryption key.

7. The communications device as claimed in claim 1, wherein the communications device is further configured, under control of the processor, to execute instructions stored in the memory to:
   receive a response message from the remote device, the response message indicating successful enrolment by the remote device, and
   store a key reference associated with the asymmetric signature key pair contained in the payload of the response message.

8. A method, performed in a client communications device, for generating a user message comprising an assertion for verification by a remote server device, the method comprising, under control of a processor of the client communications device:
   receiving a message payload for the user message, the message payload having been generated by a secure application resident on the communications device;
   applying a first level security mechanism of biometric authentication of the user, the biometric authentication comprising receiving input biometric information from the user and validating the input biometric information against biometric information for the user previously stored in the memory;
   in response to successful biometric authentication of the user, applying a second level security mechanism by generating a digital signature based on the message payload, wherein the digital signature is generated using a private signature key stored in a secure element of the client communications device during an enrolment process, wherein the private key is accessible only when the biometric authentication of the user is successful;

generating the user message for sending to the remote server device, the user message comprising the message payload and the digital signature; and applying a third level security encryption mechanism by authenticating the user message using a secure application-specific encryption key; and encrypting the user message with the encryption key, wherein the encryption key is obfuscated in memory associated with the instructions in the client communications device;

wherein the enrolment process includes generating an enrolment message comprising an assertion for verification by the remote device and the communications device is further configured to perform a method including receiving payload data for the enrolment message, in response to authentication of the user by the remote device;

performing biometric authentication of the user;

in response to successful biometric authentication of the user, generating an asymmetric signature key pair comprising the private signature key for generating the digital signature and a corresponding public signature key;

storing the private signature key in the secure element, and generating the enrolment message for sending to the remote device, the enrolment message comprising the payload data and the public signature key.

9. The method as claimed in claim 8, comprising:

generating the digital signature in a secure environment of the client communications device, and/or limiting access to the private signature key solely to the secure environment of the client communications device.

10. A non-transitory storage medium storing, which when executed by a processor of a client communications device, cause the processor to perform a method for generating a user message comprising an assertion for verification by a remote server device, the method comprising:

receiving a message payload for the user message, the message payload having been generated by a secure application resident on the communications device;

applying a first level security mechanism of biometric authentication of the user, the biometric authentication comprising receiving input biometric information from the user and validating the input biometric information against biometric information for the user previously stored in the memory;

in response to successful biometric authentication of the user, applying a second level security mechanism by generating a digital signature based on the message payload, wherein the digital signature is generated using a private signature key stored in a secure element of the client communications device during an enrolment process, wherein the private key is accessible only when the biometric authentication of the user is successful;

generating the user message for sending to the remote server device, the user message comprising the message payload and the digital signature;

applying a third level security encryption mechanism by authenticating the user message using a secure application-specific encryption key; and encrypting the user message with the encryption key, wherein the encryption key is obfuscated in memory associated with the instructions in the client communications device;

wherein the enrolment process includes generating an enrolment message comprising an assertion for verification by the remote device and the communications device is further configured to perform a method including receiving payload data for the enrolment message, in response to authentication of the user by the remote device;

performing biometric authentication of the user;

in response to successful biometric authentication of the user, generating an asymmetric signature key pair comprising the private signature key for generating the digital signature and a corresponding public signature key;

storing the private signature key in the secure element, and generating the enrolment message for sending to the remote device, the enrolment message comprising the payload data and the public signature key.

* * * * *